United States Patent
Lee et al.

(10) Patent No.: US 9,621,546 B2
(45) Date of Patent: Apr. 11, 2017

(54) METHOD OF GENERATING ONE-TIME PASSWORD AND APPARATUS FOR PERFORMING THE SAME

(71) Applicant: PENTA SECURITY SYSTEMS INC., Seoul (KR)

(72) Inventors: Seok Woo Lee, Seoul (KR); You Sik Lee, Suwon-si (KR); Sang Gyoo Sim, Seoul (KR); Duk Soo Kim, Seoul (KR); Gi Young Joo, Ulsan (KR)

(73) Assignee: PENTA SECURITY SYSTEMS INC., Seoul (KR)

( * ) Notice: Subject to any disclaimer, the term of this patent is extended or adjusted under 35 U.S.C. 154(b) by 43 days.

(21) Appl. No.: 14/575,016

(22) Filed: Dec. 18, 2014

(65) Prior Publication Data
US 2015/0180862 A1    Jun. 25, 2015

(30) Foreign Application Priority Data
Dec. 20, 2013 (KR) .......................... 10-2013-0159850

(51) Int. Cl.
*H04L 29/06* (2006.01)
(52) U.S. Cl.
CPC ................................ *H04L 63/0838* (2013.01)
(58) Field of Classification Search
CPC combination set(s) only.
See application file for complete search history.

(56) References Cited

U.S. PATENT DOCUMENTS 6,161,182 A * 12/2000 Nadooshan ............. G06F 21/31
                                                                   380/255
9,002,750 B1 * 4/2015 Chu ..................... H04L 63/0838
                                                                   705/55
(Continued)

FOREIGN PATENT DOCUMENTS

KR     100563544 B1    3/2006
KR     100751428 B1    8/2007
(Continued)

OTHER PUBLICATIONS

Authentication in an Internet Banking Environment|http://assets.complianceexpert.com/fileserver/file/10640/filename/6-96G-CGPMTSYS-Appendix-10-image.pdf|2005|Federal Financial Institutions Examination Council|pp. 1-26.*
(Continued)

Primary Examiner — Mahfuzur Rahman
(74) Attorney, Agent, or Firm — Ladas & Parry LLP (57) ABSTRACT

Disclosed is a technology related to a method of generating an OTP and an apparatus for performing the same. The method includes receiving user secret information that is input according to execution of a process of providing an OTP; authenticating the user secret information by generating a response value based on the received user secret information and a challenge value received from a user verification apparatus, and transmitting the response value to the user verification apparatus; and generating an OTP using at least one of the user secret information, the challenge value and the response value as the user secret information is authenticated, thereby effectively dealing with loss or appropriation of a user terminal and also improving the security of an OTP.

4 Claims, 4 Drawing Sheets

(56) References Cited

U.S. PATENT DOCUMENTS

| | | | |
|---|---|---|---|
| 2006/0126848 A1* | 6/2006 | Park | H04L 9/3271 380/277 |
| 2008/0098464 A1* | 4/2008 | Mizrah | G06F 21/36 726/5 |
| 2009/0288143 A1* | 11/2009 | Stebila | G06F 21/445 726/3 |
| 2011/0197266 A1* | 8/2011 | Chu | H04L 9/3228 726/5 |
| 2013/0119130 A1* | 5/2013 | Braams | G06K 7/042 235/382 |
| 2013/0124855 A1* | 5/2013 | Varadarajan | G06Q 20/3276 713/155 |
| 2013/0132091 A1* | 5/2013 | Skerpac | G10L 17/005 704/273 |
| 2014/0019766 A1* | 1/2014 | Takahashi | H04L 9/3231 713/176 |

FOREIGN PATENT DOCUMENTS

| | | |
|---|---|---|
| KR | 100796737 B1 | 1/2008 |
| KR | 1020130014676 A | 2/2013 |
| KR | 101221955 B1 | 8/2013 |
| KR | 1020120122185 A | 11/2013 |

OTHER PUBLICATIONS

A mobile based approach to strong authentication on Web |http://ieeexplore.ieee.org/stamp/stamp.jsp?tp=&arnumber=4124086|Me et al.|pp. 1-5|2006.*

* cited by examiner

METHOD OF GENERATING ONE-TIME PASSWORD AND APPARATUS FOR PERFORMING THE SAME

This application claims priority to Korean Patent Application No. 10-2013-0159850 filed on Dec. 20, 2013 in the Korean Intellectual Property Office (KIPO), the entire contents of which are hereby incorporated by reference.

BACKGROUND

1. Technical Field

Example embodiments of the present invention relate in general to a technology of authenticating a user, and more particularly, to a method of generating an one-time password (OTP) based on user secret information that is input by a user, and an apparatus for performing the same.

2. Related Art

The development of network technology has made various online services, such as banking, shopping, game, and payment, available for user by using various information communication devices. In this case, a permission to use the online service is assigned only to an authenticated user, to protect private information of users.

In this regard, a user generates a login account including a user identification (ID) and a password to receive a permission to use an online service. The generated login account is registered in a server that manages online services, and when a user enters an ID and a password for an online service that is desired by the user, the entered ID and password is compared with the login account registered in the server, and the service is provided to the user only if the ID and password matches the login account.

The above-described user authentication through an interconnection between a user and a server is currently used in most online services. However, the ID and the password of the user, transmitted through a communication network, may be exposed to an attacker who accesses network, which results in appropriation of the ID and password.

In particular, only the entering of an ID and a password has limitation in preventing a security incident in the use of electronic banking services, such as internet banking or mobile banking.

In order to overcome the above drawbacks, there is suggested a method of authenticating a user by granting an One-Time Password (OTP) in the use of an online service and entering the OTP together with login information. The OTP is generated by a user terminal or an OTP granting sever to have a limited time of use, or have a limited use only for a one-time login, and provided to a user.

However, such a method has a poor security in that an OTP may be generated without permission, once a user terminal that generates an OTP is stolen or lost, or hacked due to malicious codes or viruses.

SUMMARY

Accordingly, example embodiments of the present invention are provided to substantially obviate one or more problems due to limitations and disadvantages of the related art.

Example embodiments of the present invention provide a method of generating an OTP capable of effectively dealing with loss or appropriation of a user terminal, because an OTP is generated and issued only to a user who is authenticated through authentication of user secret information.

Example embodiments of the present invention also provide an apparatus of generating an OTP capable of improving the security of the OTP by generating the OTP based on information used to authenticate user secret information and the authenticated user secret information.

In some example embodiments, a method of generating a One-Time Password (OTP) performed by a user terminal, the method includes: receiving user secret information that is input according to execution of a process of providing an OTP; authenticating the user secret information by generating a response value based on the received user secret information and a challenge value received from a user verification apparatus, and transmitting the response value to the user verification apparatus; and generating an OTP using at least one of the user secret information, the challenge value and the response value as the user secret information is authenticated.

The authenticating of the user secret information may include: requesting the user verification apparatus to authenticate the received user secret information; receiving the challenge value from the user verification apparatus; generating a response value using the received challenge value and the user secret information; and transmitting the generated response value to the user verification apparatus.

The user verification apparatus may be configured to: store a user secret information verification value corresponding to identification information of the process that is set while the process of providing the OTP is installed in the user terminal, and store the challenge value and the response value that are used while the user secret information is authenticated.

The user verification apparatus may be configured to verify effectiveness of the OTP based on the identification information of the process, which is transmitted as the generated OTP is input to an online service that needs to authenticate a user, and the OTP.

The verifying of effectiveness of the OTP may be achieved by comparing a verification-purpose password generated using at least one of the user secret information verification value corresponding to the identification information of the process, the challenge value, and the response value, which are stored in the user authentication apparatus, with the OTP input into the online service.

In other example embodiments, an apparatus for generating an One-Time Password (OTP) implemented by a user terminal, the apparatus includes a secret information receiving unit, a secret information authenticating unit, and an OTP generating unit. The secret information receiving unit may be configured to receive user secret information that is input according to execution of a process of providing an OTP. The secret information authenticating unit may be configured to authenticate the user secret information by generating a response value based on the received user secret information and a challenge value received from a user verification apparatus, and transmitting the response value to the user verification apparatus. The OTP generating unit may be configured to generate an OTP using at least one of the user secret information, the challenge value and the response value as the user secret information is authenticated.

According to a method of generating an OTP according to an example embodiment of the present invention and an apparatus for performing the same, loss or appropriation of a user terminal can be effectively dealt with because an OTP is generated and issued only to a user who is authenticated through authentication of user secret information.

In addition, the security of the OTP can be improved by generating the OTP based on information used to authenticate user secret information and the authenticated user secret information.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the present invention will be described with reference to the accompanying drawings.

Figure 1:
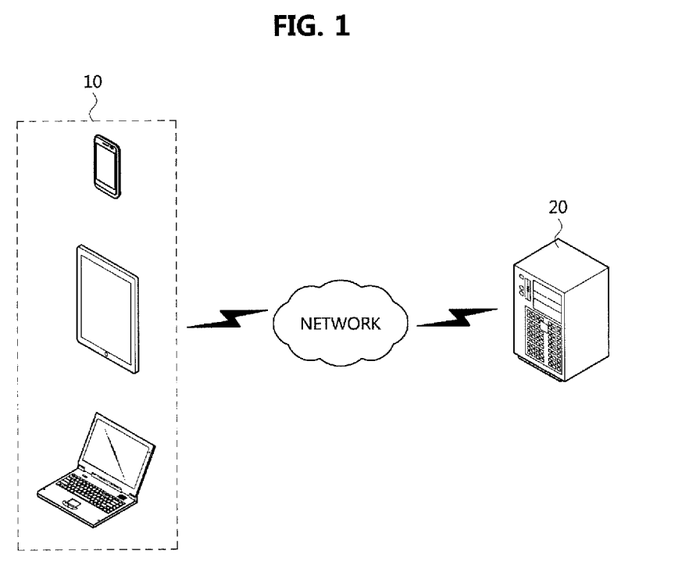
FIG. 1 is an exemplary view illustrating an operation environment for a method of generating an OTP according to an example embodiment of the present invention and an apparatus for performing the same.

FIG. 1 is a view illustrating an operation environment for a method of generating a One-Time Password (OTP) according to an example embodiment of the present invention and an apparatus for performing the same.

Referring to FIG. 1, a method of generating an OTP and an apparatus for performing the same may be implemented as a user terminal 10 is connected to a user verification apparatus 20 through a wired/wireless network, such as a Universal Serial Bus (USB), Bluetooth, Wireless Fidelity (WiFi), 3Generation (3G), and Long Term Evolution (LTE).

The user terminal 10 may include an input apparatus configured to receive an input of user secret information from a user, and may have a communication function capable of exchanging information with the user verification apparatus 20 and an information processing function capable of generating a One-Time Password (OTP). In addition, the user terminal 10 may be provided with an output apparatus capable of outputting a screen according to the use of an online service and providing a user with a result of authentication of user secret information and a result of generation of an OTP.

Although the user terminal 10 may refer to a mobile communication terminal that may be carried by a user, such as a smartphone, a tablet PC and a Personal Digital Assistant (PDA), a smart home appliance, such as a smart TV, and an information processing apparatus, such as a computer and a notebook computer, the user terminal 10 is not limited thereto, and the user terminal 10 may be provided in various devices using online services.

The on-line service refers to providing various services, such as information search, financial transaction, shopping, games, and message transmission/reception online through a web browser, or an application, and in order for a user to receive the on-line service, a permission to use the on-line service needs to be assigned from an on-line service provider to the user through a user authentication, such as login.

According to the present invention, user authentication for an online service is performed using an OTP generated from the user terminal 10, to tighten a security involving user authentication. However, if the user terminal 10 is infected by malicious codes or viruses or stolen, lost or illegally appropriated, and thus an OTP is generated by an attacker without permission, a security incident including leakage of personal information of users may occur.

Accordingly, user secret information is authenticated through the user verification apparatus 20 connected to the user terminal 10, and only when the user secret information is authenticated, an OTP is allowed to be generated. In addition, the effectiveness of an OTP is verified through the user verification apparatus 20, so that the security of an online service using an OTP is tightened.

To this regard, the user verification apparatus 20 may refer to an information processing apparatus, such as a computer, a notebook computer, a smartphone, a tablet PC and a PDA, having a communication function to exchange information with the user terminal 10 or an information processing function to perform verification of an effectiveness with respect to user secrete information or an OTP according to a request of the user terminal 10, or a server equivalent thereto. However, the user verification apparatus 20 is not limited thereto.

Figure 2:
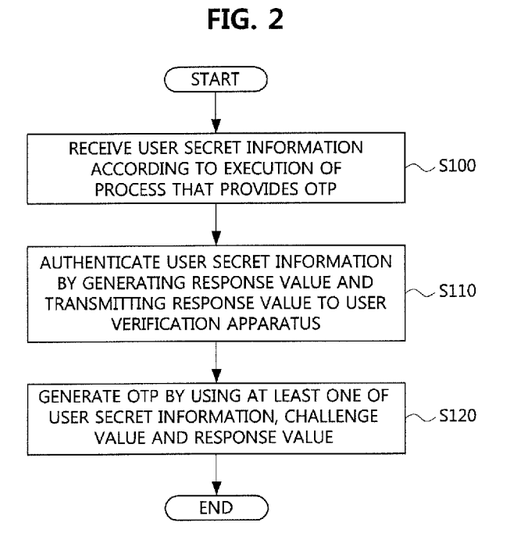
FIG. 2 is a flowchart for describing a method of generating an OTP according to an example embodiment of the present invention.
Figure 3:
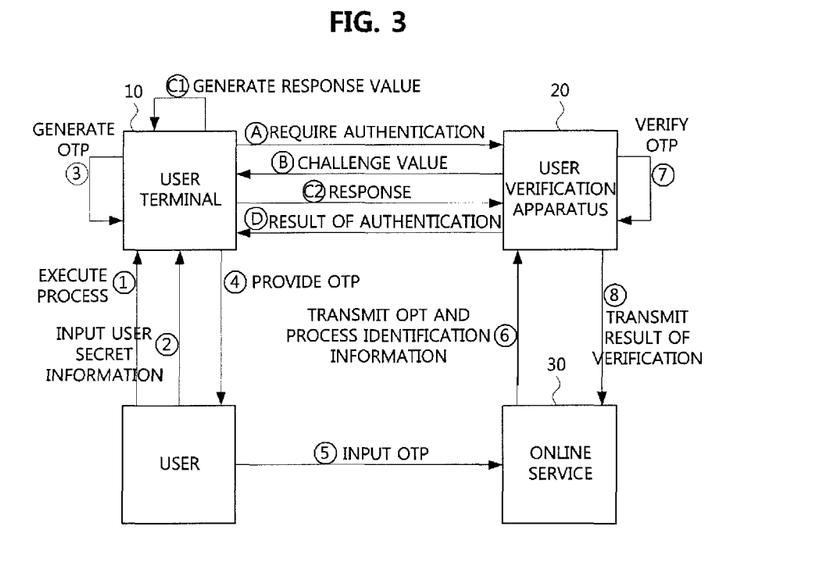
FIG. 3 is an exemplary view illustrating a generation of an OTP according to an example embodiment of the present invention.

FIG. 2 is a flowchart for describing a method of generating an OTP according to an example embodiment of the present invention, and FIG. 3 is an exemplary view illustrating generation of an OTP according to an example embodiment of the present invention.

Figure 4:
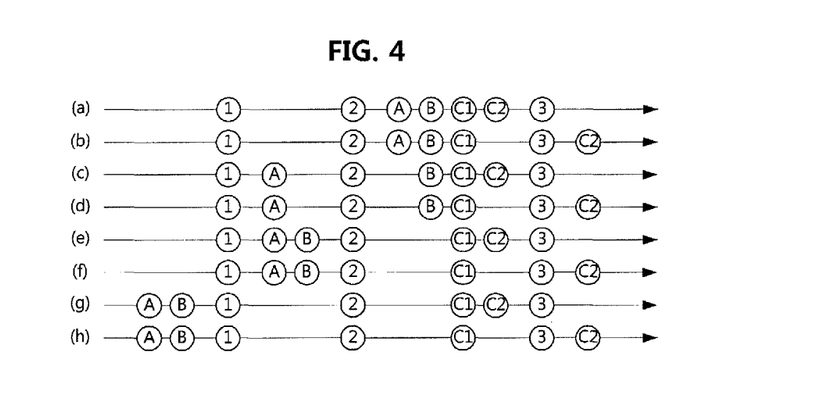
FIG. 4 is an exemplary view illustrating various arrangements of operations of a generating an OTP according to an example embodiment of the present invention.

FIG. 4 is an exemplary view illustrating various combinations of operations of generating an OTP according to an example embodiment of the present invention.

Referring to FIGS. 2 to 4, a method of generating a One-Time Password (OTP) may include receiving user secret information that is input according to execution of a process of providing an OTP (S100), authenticating the user secret information by generating a response value and transmitting the response value to the user verification apparatus (S110), and generating an OTP using at least one of the user secret information, the challenge value, and the response value (S120).

The method of generating the OTP may be performed by the user terminal 10, and when a user executes a process implemented in the user terminal 10 and configured to provide an OTP (①), the user terminal 10 may receive user secret information that is input from the user (②) (S100).

The process of providing the OTP may refer to a dedicated application that generates the OTP, and a user secret information verification value corresponding to identification information of the process that is set while the process is installed in the user terminal 10 may be registered in the user verification apparatus 20.

In this case, the user secret information is authentication information for receiving a permission to use a process of providing the OTP, and may refer to an input signal, such as a password or a pattern, that is input through the input apparatus of the user terminal 10 by the user, but the present invention is not limited thereto. For example, the user secret information may include voice or movement that may be input from various input sensors mounted in the user terminal 10, or a motion of the user terminal 10.

In the conventional technology, the user terminal 10 stores a user secret information verification value, and a permission to access a process of providing an OTP is assigned by comparing user-secret information input from a user with the user secret information verification value to determine a match therebetween. However, according to the present invention, a user secret information authentication value is registered in the user verification apparatus 20, thereby effectively dealing with a security incident due to stealing, loss or illegal appropriation of the user terminal 10.

Authentication of user secret information input by a user is achieved by generating a response value based on a challenge value received from the user verification apparatus 20 and transmitting the response value to the user verification apparatus 20 (S110).

In more detail, referring to FIG. 3, the user verification apparatus 20 is requested to authenticate user secret information (A), and the user verification apparatus 20 generates a challenge value. The challenge value may refer to a random number issued by the user verification apparatus 20 to authenticate user secret information, but the challenge value is not limited thereto. The generated challenge value may be provided to the user terminal 10 (B).

The user terminal 10 may generate a response value using the challenge value received from the user verification apparatus 20 and the user secret information (C1). In this case, the response value may be generated using hash functions, symmetric-key algorithms, and asymmetric-key algorithms, but the response value is not limited thereto.

When the generated response value is transmitted to the user verification apparatus 20 (C2), the user verification apparatus 20 may verify the effectiveness of the response value, thereby performing the authentication of the user secret information. The result of authentication of the user secret information depending on the verification of effectiveness of the response value may be provided to the user terminal 10 (D). In this case, the user verification apparatus 20 may store the challenge value and the response value that are used in the process of authenticating the user secret information.

If the authentication of the user secret information fails, the user terminal 10 determines that a security incident may be caused due to stealing or loss of the user terminal 10, and thus an OTP is not generated.

The user verification apparatus 20 may generate the OTP using at least one of the challenge value and the response value that have been used to authenticate the user secret information, and the user secret information (③) (S120). Thus, the generated OTP may be provided to the user (④).

The user may input login information including user identification information (ID) and a user password that are previously registered to use the online service 30, and the OTP received from the user terminal 10 into the online service 30 (⑤).

When the OTP is input to the online service 30, the online service 30 may transmit the OTP and the process identification information to the user verification apparatus 20 to verify the effectiveness of the OTP that is input for authentication of the online service (⑥). The user verification apparatus 20 may generate a verification-purpose password using at least one of the user secret information verification value, which corresponds to the identification information of the process, the challenge value and the response value. The effectiveness of the OTP is verified by comparing the OTP with the verification-purpose password (⑦). The result of verification of the effectiveness of the OTP may be transmitted to the online service 30 (⑧).

If the effectiveness of the OTP is verified, the online service 30 is provided to a user 30. Meanwhile, if the effectiveness of the OTP is not verified, a dialog window that to demands reinputting of the OTP or registration of a process generating a new OTP may be provided to the user.

The above-described method of generating an OTP may be achieved as in (a) of FIG. 4 in which a process of generating an OTP is executed by a user (①) and accordingly, user secret information is input by the user (②). When the user terminal 10 requests the user verification apparatus 20 to authenticate user secret information (A), the user verification apparatus 20 provides a challenge value (B), and the user terminal 10 may generate a response value based on the challenge value and the user secret information (C1). The generated response value is transmitted to the user verification apparatus 20 (C2) to perform authentication on the user secret information in the user verification apparatus 20, and if the user secret information is authenticated, an OTP is generated (③), and the generated OTP is provided to the user (④).

However, the order of the above-described operations is not limited. As shown in (b) of FIG. 4, a response value may be generated by the user terminal 10 (C1), and an OTP may be generated using the generated response value, the challenge value and the user secret information, and then the response value may be transmitted to the user verification apparatus 20 (C2). In addition, as shown in operations (c) to (h) of FIG. 4, an OTP may be generated by changing order arrangements of operations A to C2 and operations of ① and ③, but the OTP is not limited thereto.

With regard to (c) to (h) of FIG. 4, the operations need to be arranged in the given order of A, B, C1, C2 and D and the given order of ①, ② and ③.

Operation ② of receiving user secret information from a user needs to be performed prior to operation (C1) of generating a response value, and in particular, operation (C1) needs to be performed prior to operation ③ of generating an OTP.

With regard to (g) to (h) of FIG. 4, first, the user verification apparatus 20 is requested to authenticate user secret information (A) so that a challenge value is received from the user verification apparatus 20 (B). At this time, operation (A) requesting for authentication of user secret information may be performed by the third party rather than a user of the user terminal 10, and the receiving of a challenge value may be achieved using a push service or its equivalent service, that is, a service for transmitting a challenge value from the user verification apparatus 20 to the user terminal 10 according to a request of the third party.

Figure 5:
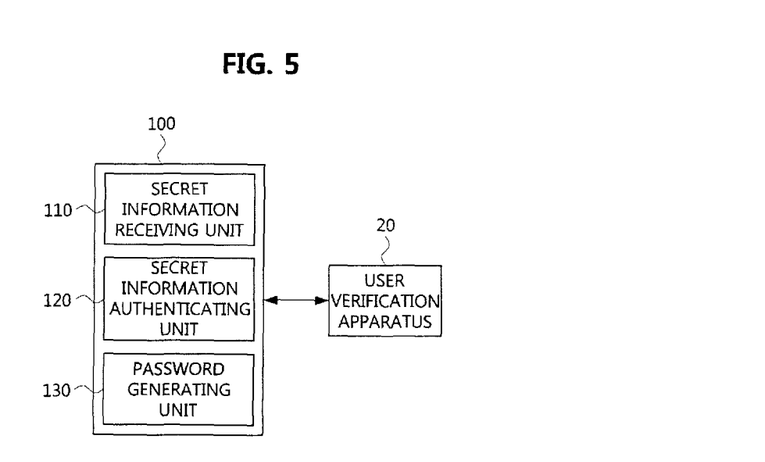
FIG. 5 is a block diagram illustrating an apparatus of generating an OTP according to an example embodiment of the present invention.

FIG. 5 is a block diagram illustrating an apparatus for generating an OTP according to an example embodiment of the present invention.

Referring to FIG. 5, an apparatus for generating an OTP 100 may include a secret information receiving unit 100, a secret information authenticating unit 120, and an OTP generating unit 130.

The apparatus for generating the OTP 100 may be implemented using the user terminal 10, and the apparatus for generating the OTP 100 and the user verification apparatus 20 may be connected to each other through wired/wireless networks, such as a Universal Serial Bus (USB), bluetooth, Wireless Fidelity (WiFi), 3G and Long Term Evolution (LTE), to exchange information with each other.

The secret information receiving unit 110 may receive user secret information that is input according to execution of a process of providing the OTP.

The process of providing the OTP may refer to a dedicated application that generates the OTP, and a user secret information verification value corresponding to identification information of the process that is set while the process is installed in the user terminal 10 may be registered in the user verification apparatus 20.

That is, when the process of providing the OTP is executed, a user may input user secret information to .the user terminal 10. In this case, authentication information for receiving a permission to use the process of providing the OTP may refer to an input signal, such as a password or a pattern, which is input by a user through the input apparatus of the user terminal 10, but the authentication information is not limited thereto. For example, the authentication information may include voice or movement that is input from various input sensors mounted in the user terminal 10, or a motion of the user terminal 10.

The secret information authenticating unit 120 may generate a response value based on the received user secret information and the challenge value received from the user verification apparatus 20, and may transmit the response value to the user verification apparatus 20, thereby authenticating the user secret information.

In more detail, when the user verification apparatus 20 is requested to authenticate user secret information, the user verification apparatus 20 generates a challenge value, and provides the generated challenge value to the secret information authenticating unit 120. In this case, the challenge value may refer to a random number issued by the user verification apparatus 20 to authenticate user secret information, but the challenge value is not limited thereto.

The secret information authenticating unit 120 may generate a response value using the challenge value received from the user verification apparatus 20 and the user secret information. In this case, the response value may be generated using hash functions, symmetric-key algorithms, and asymmetric-key algorithms, but the response value is not limited thereto When the generated response value is transmitted to the user verification apparatus 20, the user verification apparatus 20 may verify the effectiveness of the response value, thereby performing the authentication of the user secret information. Accordingly, the secret information authenticating unit 120 may receive the result of authentication of the user secret information. In this case, the user verification apparatus 20 may store the challenge value and the response value that are used in the process of authentication of the user secret information.

The OTP generating unit 130 may allow the user verification apparatus 20 to generate an OTP using at least one of the user secret information, the challenge value, and the response value.

When the generated OTP is provided to a user, the user may input login information including user identification information (ID) and a user password that are previously registered to use an online service, and the OTP to the online service.

When the OTP is input to the online service, the OTP and the process identification information may be transmitted to the user verification apparatus 20 to verify the effectiveness of the OTP that is input to authenticate the online service. The user verification apparatus 20 may generate a verification-purpose password using at least one of the user secret information verification value, which corresponds to the identification information of the process, the challenge value and the response value that are stored in the user verification apparatus 20.

Thus, the OTP may be compared with the verification-purpose password to verify the effectiveness of the OTP. If the effectiveness of the OTP is verified, the online service is provided to the user. Meanwhile, if the effectiveness of the OTP is not verified, a dialog window that demands reinputting of the OTP again or registration of a process of generating a new OTP may be provided to the user.

According to the method of generating the OTP according to embodiments of the present invention and the apparatus for performing the same, loss or appropriation of a user terminal can be effectively dealt with because an OTP is generated and issued only to a user who is authenticated through authentication of user secret information.

In addition, the security of the OTP can be improved by generating the OTP based on information used to authenticate user secret information and the authenticated user secret information.

While the example embodiments of the present invention and their advantages have been described in detail, it should be understood that various changes, substitutions and alterations may be made herein without departing from the scope of the invention.

What is claimed is:

1. A method of generating a One-Time Password (OTP) performed by a user terminal including a processor, the method comprising:
receiving, by the processor, user secret information that is input according to execution of a process of providing an OTP;
requesting, by the processor, the user verification apparatus to authenticate the received user secret information;
receiving, by the processor, a challenge value from the user verification apparatus;
generating, by the processor, a response value using the received challenge value and the user secret information;
transmitting, by the processor, the generated response value to the user verification apparatus; and
generating, by the processor, an OTP using at least one of the user secret information, the challenge value and the response value when the user secret information is authenticated by verifying of an effectiveness of the response value in the user verification apparatus,
wherein the user verification apparatus is configured to store a user secret information verification value corresponding to identification information of the process that is set while the process of providing the OTP is installed in the user terminal, and store the challenge value and the response value that are used while the user secret information is authenticated, and
wherein the user verification apparatus is configured to verify effectiveness of the OTP based on the identification information of the process, which is transmitted as the generated OTP is input to an online service that needs to authenticate a user, and the OTP.

2. The method of claim 1, wherein the verifying of effectiveness of the OTP is achieved by comparing a verification-purpose password generated using at least one of the user secret information verification value corresponding to the identification information of the process, the challenge value, and the response value, which are stored in the user authentication apparatus, with the OTP input into the online service.

3. An apparatus for generating an One-Time Password (OT P) implemented as a user terminal, the apparatus comprising:
a processor; and
a memory storing at least one instruction is configured to:
receive user secret information that is input according to execution of a process of providing an OTP;
request a user verification apparatus to authenticate the received user secret information;
receive a challenge value from the user verification apparatus;
generate a response value based on the received challenge value and the user secret information;
transmit the response value to the user verification apparatus; and
generate an OTP using at least one of the user secret information, the challenge value, and the response value when the user secret information is authenticated by verifying of the effectiveness of the response value in the user verification apparatus,
wherein the user verification apparatus is configured to store a user secret information verification value corresponding to identification information of the process that is set while the process of providing the OTP is installed in the user terminal; and store the challenge value and the response value that are used while the user secret information is authenticated, and
wherein the user verification apparatus is configured to verify effectiveness of the OTP based on the identification information of the process, which is transmitted as the generated OTP is input to an online service that needs to authenticate a user, and the OTP.

4. The apparatus of claim 3, wherein the verifying of effectiveness of the OTP is achieved by comparing a verification-purpose password generated using at least one of the user secret information verification value corresponding to the identification information of the process, the challenge value and the response value, which are stored in the user authentication apparatus, with the OTP input into the online service.

* * * * *